US005837146A

United States Patent [19]
Alper

[11] Patent Number: 5,837,146
[45] Date of Patent: *Nov. 17, 1998

[54] OIL COAGULANT PRODUCTS AND METHODS OF USE THEREFOR

[75] Inventor: Haluk Alper, Flowery Branch, Ga.

[73] Assignee: Mansfield & Alper, Inc., Gainesville, Ga.

[ * ] Notice: The term of this patent shall not extend beyond the expiration date of Pat. No. 5,437,793.

[21] Appl. No.: 764,439

[22] Filed: Dec. 12, 1996

Related U.S. Application Data

[63] Continuation-in-part of Ser. No. 572,986, Dec. 15, 1995, Pat. No. 5,746,925, which is a continuation-in-part of Ser. No. 506,968, Jul. 28, 1995, Pat. No. 5,698,139, which is a division of Ser. No. 74,114, Jun. 8, 1993, Pat. No. 5,437,793.

[51] Int. Cl.$^6$ .............................. B01J 13/00; C02F 1/54; C02F 1/56
[52] U.S. Cl. .......................... 210/728; 210/733; 210/925; 252/314; 252/315.1; 252/315.4; 427/212; 427/221; 524/313; 524/917; 525/301.5
[58] Field of Search .............................. 252/315.1, 315.4, 252/314, 358; 524/313, 917; 210/728, 732, 733, 734, 705, 925; 525/301.5; 427/212, 221

[56] References Cited

U.S. PATENT DOCUMENTS

| | | | |
|---|---|---|---|
| 2,418,920 | 4/1947 | Berger et al. | 252/315.4 |
| 2,441,068 | 5/1948 | Hewitt et al. | 525/301.5 X |
| 3,067,154 | 12/1962 | Sterling | 524/313 |
| 3,755,189 | 8/1973 | Gilchrist et al. | 252/315.4 |
| 3,775,448 | 11/1973 | Guhr et al. | 252/315.4 |
| 3,776,864 | 12/1973 | Woerner | 524/313 X |
| 3,821,109 | 6/1974 | Gilchrist et al. | 210/749 |
| 3,835,049 | 9/1974 | King | 210/758 |
| 3,917,528 | 11/1975 | Orban et al. | 210/680 |
| 3,977,969 | 8/1976 | Zall | 210/666 |
| 4,156,040 | 5/1979 | Swider et al. | 427/226 |
| 4,200,561 | 4/1980 | Chang | 524/313 X |
| 4,420,400 | 12/1983 | Weitzen | 210/710 |
| 4,420,573 | 12/1983 | Fogg et al. | 523/333 |
| 4,502,975 | 3/1985 | Kobayashi et al. | 252/315.1 |
| 4,519,918 | 5/1985 | Ericsson et al. | 210/680 |
| 4,786,717 | 11/1988 | Bretches et al. | 528/491 |
| 4,810,395 | 3/1989 | Levy et al. | 252/315.4 |
| 5,326,394 | 7/1994 | Cobb | 524/313 X |
| 5,382,371 | 1/1995 | Stahl et al. | 507/221 |
| 5,405,932 | 4/1995 | Bender et al. | 528/104 |
| 5,427,612 | 6/1995 | Bender | 524/270 |
| 5,429,741 | 7/1995 | Webb et al. | 210/242.4 |
| 5,437,793 | 8/1995 | Alper | 210/728 |
| 5,698,139 | 12/1997 | Alper | 252/314 |

FOREIGN PATENT DOCUMENTS 859836  2/1978  Belgium .

OTHER PUBLICATIONS

D. Swern, ed. Bailey's Ind. Oil Fat Prod. vol. 1:687 (1979).

*Primary Examiner*—Richard D. Lovering
*Attorney, Agent, or Firm*—Klauber & Jackson

[57] ABSTRACT

Oil coagulant compositions, and methods of using such compositions to coagulate the oil that has been spilled on water are prepared from a thermal reaction utilizing an oil component selected from the group consisting of glycerides, fatty acids, alkenes and alkynes, and a copolymer component. Representative polymers include, for example, isobutyl methacrylate polymers, and representative oil components include, for example, glycerides such as those derived from a drying oil such as linseed oil. The composition of the present invention floats on the water surface and coagulates oil independent of both agitation and temperature, and can be used in both salt and fresh water. After the coagulant has coagulated the spilled oil, the floating coagulated oil can be readily removed from the water by mechanical means such that at least 99.9% of the oil is removed from the water and only a faint trace of oil remains in the water. An alternate way of using the composition is to incorporate it into a porous substrate, which substrate is then applied to the spilled oil. Preferably, the porous substrate is a floatable material, enabling the product to keep afloat Group 5 oils or asphalt.

50 Claims, 8 Drawing Sheets

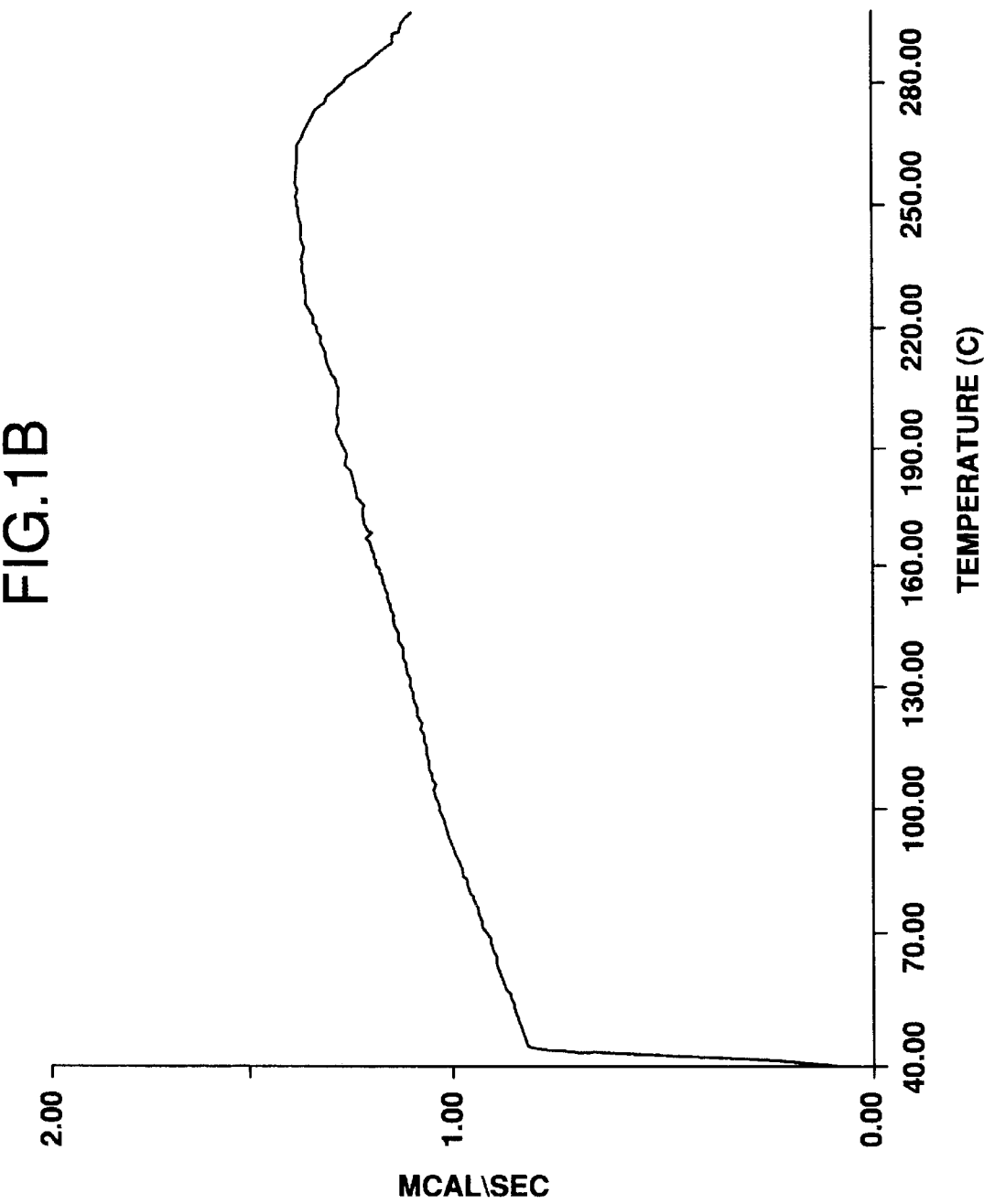

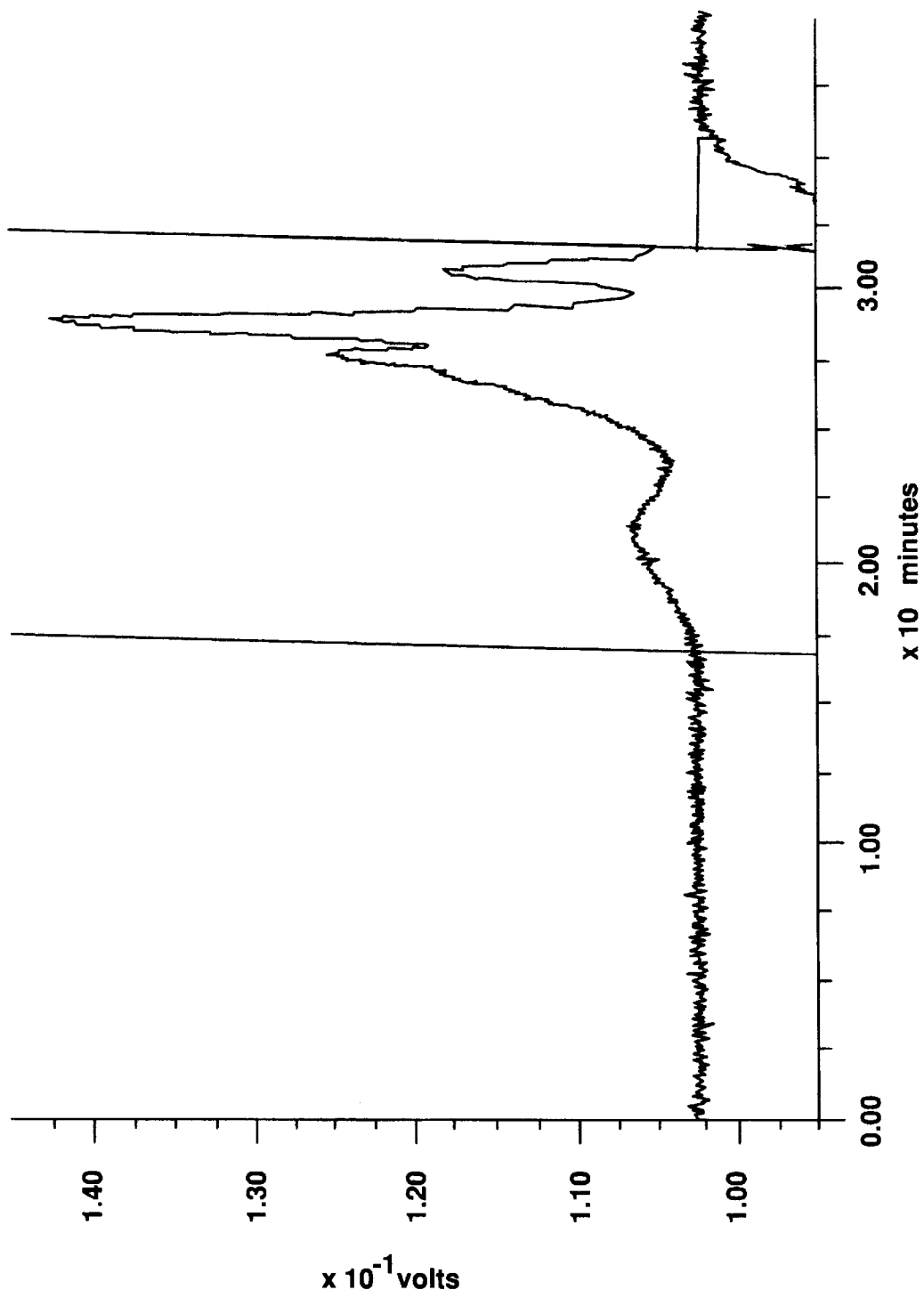

OIL COAGULANT PRODUCTS AND METHODS OF USE THEREFOR

This application is a continuation-in-part of application Ser. No. 08/572,986, filed Dec. 15, 1995, now U.S. Pat. No. 5,746,925, which is a continuation-in-part of application Ser. No. 08/506,968, filed Jul. 28, 1995, now U.S. Pat. No. 5,698,139, which is a division of application Ser. No. 08/074,114, filed Jun. 8, 1993 now U.S. Pat. No. 5,437,793.

FIELD OF THE INVENTION

The present invention relates to the treatment of oil and asphalt slicks and spills on the surface of bodies of water. More particularly this invention relates to methods of making and using compositions that will coagulate and/or enhance the viscoelasticity of the spilled oil or asphalt such that the spilled oil or asphalt can be readily removed from the water surface. The coagulant compositions are synthesized from particular combinations of an oil component selected from the group consisting of glyceride, fatty acids, alkenes and alkynes, and a polymer component, and may be further diluted with a solvent for ease of handling, and application. An oil mass coagulated by the instant compositions floats on the surface of the water and can be easily scooped or otherwise removed from the water. The composition can be applied directly to an oil spill, or, alternatively, can be impregnated upon a porous substrate, such as vermiculite, which is then spread upon the spill.

BACKGROUND OF THE INVENTION

Unfortunately, repeated incidents of oil and asphalt spillage in both fresh and salt water are well known. Recent history has evidenced the disastrous results that are caused by oil spills. Spilled oil causes damage to marine life, contamination of the water itself, damage to the shoreline and damage to birds and other wild life that are dependent upon the contaminated water. In the case of an asphalt spill, the liquid asphalt usually cools quickly, solidifies, and then sinks below the water surface, necessitating expensive diving salvage operations to avoid becoming a biohazard. Because oil and asphalt spills cause great losses both environmentally and, of course, financially, compositions, methods of making compositions, and methods of using compositions that will control an oil or asphalt spillage such that the spilled material can be readily removed from a water surface are in great need.

Many methods of controlling oil spills have been devised in the past few years. For instance, mechanical devices such as fences, booms, and skimmers have been used to physically contain or remove oil that has been spilled on a water surface. In addition, various types of oil absorbants have also been used in the past, such as, for example, straw. Various chemical treatments have also been used to either contain or coagulate spilled oil. U.S. Pat. No. 3,755,189 to Gilchrist et al. teaches a composition for the control of oil floating on water that comprises a drying oil, a solvent and a catalyst used in combination as a composition that is able to confine oil that is floating on the surface of the water. In addition, U.S. Pat. No. 3,977,967 to Zall teaches a method of containing oil spills that uses a polymer of high molecular weight that is able to gel or coagulate the spilled oil so that the coagulated oil can be easily raked off the surface of the water.

The prior art compositions and methods of Gilchrist et al. and Zall provide moderately effective means for removing spilled oil from a water surface, especially in calm water conditions. However, a composition that is able to confine, coagulate, float and control spilled oil in both calm and rough choppy water has heretofore not been known. Due to the nature of oil and water, he lighter components of oil typically evaporate from the surface of the water in 24–28 hours, while the heavier components of the oil typically sink below the surface of the water and eventually form an emulsion with the water. Previous compositions and methods have been ineffective in removing the spilled oil from the water surface, especially in the rough water conditions which are typically prevalent in oil spill situations.

Blends of a soft elastomeric polymer with a glyceride, useful as adhesives and sealing compounds, are disclosed in Sterling, U.S. Pat. No. 3,067,154. These mixtures are a blend of 10 to 50 parts by weight of the final composition elastomeric polymer with 5 to 25 parts by weight of the final composition oil, and contain other ingredients such as talc, clay, and solvent. These mixtures have not been subjected to thermal reaction conditions, and would not function to coagulate oil on water so that the oil can be easily removed from the water.

SUMMARY OF THE INVENTION

In parent U.S. Pat. No. 5,437,793, a coagulant product is disclosed which comprises linseed oil chemically reacted with isobutyl methacrylate polymer, which is then diluted with a solvent, such as 2,2,4-trimethyl-1, 3-pentanediol monoisobutyrate. The composition formed by the thermal reaction of the linseed oil with the isobutyl methacrylate polymer is a soft resinous product which, when diluted with the solvent, results in a mixture that can be sprayed onto an oil spill or otherwise introduced to the oil spill to coagulate the oil. Further experimentation has led to the discovery of new products produced from polymers and a variety of natural animal and vegetable oils, fatty acids, alkenes and alkynes.

The present invention thus concerns a composition which is the thermal reaction product of a polymer component with an oil component selected from the group consisting of glycerides, fatty acids, alkenes and alkynes. Depending upon the end use of the product, the reaction conditions can be adjusted to provide a "first endpoint" product or a "second endpoint" product. Preferred compositions are disclosed which comprise the thermal reaction products of methacrylate polymers with a glyceride derived from a variety of natural animal and vegetable oils, or the thermal reaction products of methacrylate polymers with a fatty acid, alkene, alkyne containing from about 8–24 carbon atoms. The combination of a methacrylate polymer component with any of these oil components can provide either a first or second endpoint product, depending upon the reaction conditions.

The term "first endpoint product" is used to describe the solubility product of the reaction which is a cooperative structure held together by many reinforcing, noncovalent interactions, including Van Der Waals attractive forces, hydrogen bonding and so forth. The term "second endpoint product" is used to describe the product of the reaction which is the result of covalent bond formation between the polymer component and the oil component, as indicated by the change in average molecular weight of the product and molecular weight distribution.

The present invention also concerns novel devices for use in the cleanup procedures attendant to oil spills, especially devices adapted to carry and to apply the compositions of the instant invention to such oil spills, and thus facilitate cleanup procedures.

It is therefore an object of the present invention to provide an oil coagulant composition, as well as methods of making and using the composition, particularly in the cleanup of various oils, such as fuel oil, crude oil, and non-detergent motor oil, and asphalt.

It is also an object of the present invention to provide a composition that will coagulate both the heavy and light components of oil, and will float on the surface of the water, thereby preventing the heavier oil components from sinking beyond recovery, or forming an emulsion with the water.

It is also an object of the present invention to provide a method for making the coagulant polymer/oil composition of the present invention, which can then be further diluted with a suitable solvent to provide a coagulant product that can be applied to a substrate.

It is a further object of the present invention to provide a composition that is able to coagulate spills at various temperatures and types of water in which the spill has occurred.

It is yet another object of the present invention to provide a coagulant composition that removes at least 99.9% of the oil spilled in water such that only a trace amount, if any, remains.

DESCRIPTION OF THE DRAWINGS

FIG. 1B is a DSC profile of the product of Example 9.

FIG. 2(a) is a top view of a preferred embodiment of a mat or pad material suitable for folding along axis a—a.

FIG. 2(b) is an exaggerated perspective view of the mat or pad of FIG. 2(a) suitable for folding along axis b—b.

FIG. 2(c) is an exaggerated perspective view of the mat or pad of FIG. 2(b) suitable for folding along axis c—c.

FIG. 2(d) is an exaggerated perspective view of the mat or pad of FIG. 2(c) shown sealed or sewn along the positions marked by an "x".

FIG. 2(e) is a side view of FIG. 2(d).

FIG. 2(f) is an alternate embodiment of the folded mat or pad of FIG. 2(d) having cut fingers.

FIG. 2(g) is a side view of FIG. 2(f) showing the bottom edges of the finger loops cut.

FIG. 3(a) is a perspective view of a preferred embodiment of a mat or pad suitable for forming a containment boom.

FIG. 3(b) is a side view of FIG. 3(a), shown without edge or spot sealing.

FIG. 3(c) is a preferred containment boom configuration formed from the mat or pad of FIGS. 3(a) and 3(b).

FIG. 5 shows a chromagram of the molecular weight determination of the product of Paragraph B of Example 1.

DETAILED DESCRIPTION OF THE INVENTION

Figure 1A:
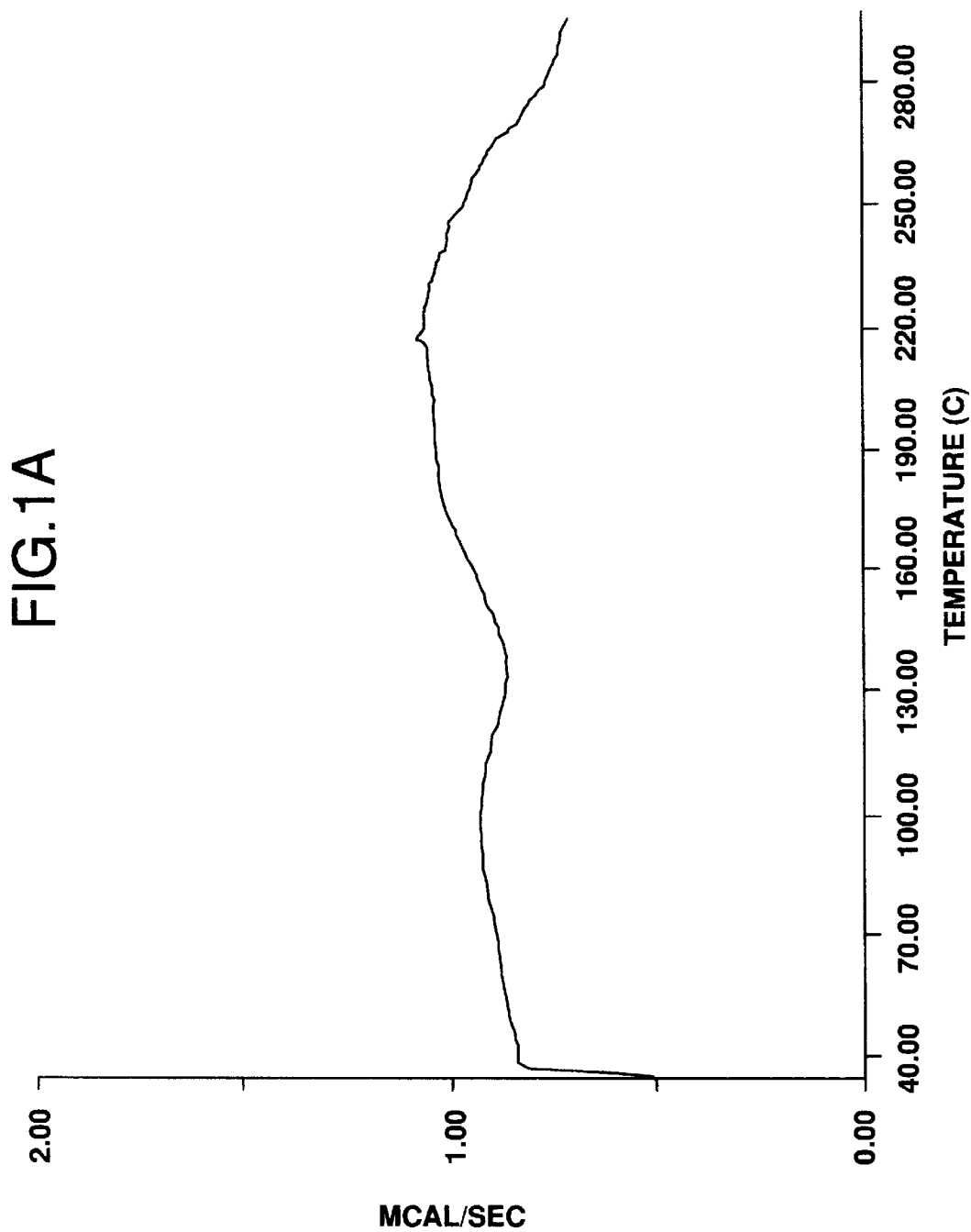
FIG. 1A is a differential scanning calorimetry (DSC) profile of the starting materials of Example 9.

The present invention concerns a method of making a novel composition, the composition itself, and a method for using the composition to coagulate oil spills. The instant composition is readily synthesized from a polymer component and an oil component selected from the group consisting of glycerides, fatty acids, alkenes and alkynes. In a preferred embodiment, the coagulant product is synthesized from an isobutyl methacrylate polymer, and the oil component is one derived from a natural oil, such as linseed oil or sunflower oil. Optionally, the coagulant composition is then diluted with a solvent, such as 2,2,4-trimethyl-1,3-pentanediol monoisobutyrate or acetone. If desired, the diluted coagulant composition can then be applied to a solid adsorbent or absorbent recovery substrate which is then applied to the surface where the oil spill has occurred.

The polymer component of the composition is a synthetic polymer such as polymers derived from methacrylates. Preferably, the polymer is derived from methyl methacrylate, ethyl methacrylate, isobutyl methacrylate, or n-butyl methacrylate, or may be a copolymer containing a methacrylate polymer. Most preferably, the polymer is a poly(isobutyl methacrylate) polymer such as that obtainable from ICI Acrylics as ELVACITE® 2045, or a methacrylate/methacrylic acid copolymer such as ELVACITE® 2008 or 2043. However, it is anticipated that other equivalent polymers can be used to prepare equivalent compositions of the invention. Combinations of polymers can be used to advantage in the process of the instant invention.

The test used to determine whether or not a polymer can be used in accordance with the present invention is to combine the polymer component in question with the oil component, as set forth herein, to see if the resultant combination forms a homogenous product after heating. Ideally, the polymer component percentage of the composition should range from about 15–75%, preferably 20–40%, or more preferably from about 25–35%, by weight.

In one embodiment of the present invention, the oil component of the composition is a glyceride derived from oils of vegetable or animal origin. Vegetable oils are obtained by cold pressing the seeds of a plant to obtain the oil contained therein. Of the vegetable oils, drying oils such as sunflower, tung, linseed, and the like; and semi-drying oils, such as soybean and cottonseed oil, have been shown to be useful as the glyceride component of the invention. Animal oils, such as, for example, fish oil, tallow and lard can also be used as a glyceride component of the invention. It is anticipated that any drying oil or semi-drying oil is usable in the invention. Generally, a drying oil is defined as a spreadable liquid that will react with oxygen to form a comparatively dry film. Optionally, combinations of two or more glycerides can be used as reactants with the polymer in the process of the invention to provide oil coagulant compositions useful in the methods of the present invention.

In a preferred embodiment, the oil component of the composition is a glyceride derived from a drying oil, such as linseed oil, that can be obtained from Cargill, Inc. as Supreme Linseed Oil, or sunflower oil. The glyceride should comprise from about 25–85%, preferably about 60–80%, and most preferably, from about 65–75% of the coagulant composition. All percentages in this disclosure are by weight, unless otherwise stated.

Where the oil component of the composition of the present invention is a fatty acid or alkene or alkyne utilized as the reactant with the polymer, it contains from about 8 to 24 carbon atoms, and preferably from about 10 to 22 carbon atoms. Such fatty acids, alkenes and alkynes are commercially available from many suppliers. Typical fatty acids include both saturated and unsaturated fatty acids, such as lauric acid [dodecanoic acid], linolenic acid, cis-5-dodecanoic acid, oleic acid, erucic acid [cis-docosanoic acid], 10-undecynoic acid, stearic acid, caprylic acid, caproic acid, capric acid [decanoic acid], palmitic acid, docosanoic acid, myristoleic acid [cis-9-tetradecenoic acid], and linoleic acid. Typical alkenes and alkynes contain at least one and preferably one or two degrees of unsaturation, and from about 8 to 24 carbon atoms, with 10–20 carbon atoms being preferred. Preferred alkenes and alkynes are those such as 1-decene, trans-5-decene, trans-7-tetradecene, 1,13-tetradecadiene, 1-tetradecene, 1-decyne, and 5,7-dodecadiyne.

The process of the instant invention produces a product with characteristics different from either of the starting materials or a simple mixture of the two starting materials, thus showing that a new composition is produced by the thermal reaction. Specifically, oil/polymer coagulant compositions of the present invention pass a "clear pill" test after being heated at the elevated temperatures and do not separate into two parts upon being cooled but, rather form a homogenous, uniphase compound.

The resultant coagulant composition can be used by itself in some applications or it can be diluted with a solvent. The amount of solvent used will vary depending upon the relative percentage of the oil component in the coagulant composition. For example, if more oil component is present, the composition will be more fluid and less solvent need be used. The solvent, or diluent, component of the coagulant product should generally comprise any liquid or mixture of liquids that is able to dissolve or dilute the coagulant composition. The solvent/diluent should control the evaporation, desired flow and coalescing of the intermediate composition. And, in consideration of marine life, the toxicity of the solvent must be considered. More specifically, the solvent can be selected from aliphatic hydrocarbons, aromatic hydrocarbons, alcohols, ketones, ethers, aldehydes, phenols, carboxylic acids, synthetic chemicals and naturally occurring substances.

In one embodiment, the solvent component of the coagulant can also be a previously specified glyceride where the coagulant composition is approximately 100 percent solids. In this case, toxicity from solvents is virtually eliminated and a product that is extremely viscous is formed that can be useful in certain applications.

In a preferred embodiment, the solvent is 2,2,4-trimethyl-1,3-pentanediol monoisobutyrate or acetone. When a solvent is utilized, it is preferably used in an amount which is about 50% of the coagulant product, although the total solvent percentage of the coagulant/solvent product can range from about 35 to about 95%.

The coagulant composition of the present invention is prepared by a thermal reaction process. The first step of the process involves heating the oil component (glyceride or fatty acid or alkene or alkyne) to approximately 235°–350° F. at a rate of about 5° F. per minute with continuous stirring. Then, the polymer component, usually in powdered form, is slowly stirred into the heated oil component. Depending upon the particular reactants used, the oil component should range from about 25–85%, preferably about 65–80%, more preferably about 72–77%, and the polymer should range from about 1–50%, preferably about 20–40%, more preferably about 23–28%, of the coagulant composition. After this mixture has been mixed properly, the mixture should be heated to approximately 400°–700° F., depending on the particular components utilized for the reaction, and the desired endpoint of the reaction. Typically, reaction temperatures below about 500° F. produce "first endpoint products" while temperatures above about 500° F. produce "second endpoint products."

The mixture should be heated at that temperature until a clear pill test indicates that the reaction has reached its first end point, i.e., a drop of the hot reaction mixture when placed on a clear glass plate cools to a clear film. When a clear pill test indicates that the reaction has reached its first end-point, the mixture should be cooled to a temperature below 200° F., generally about 180° F. After cooling, the coagulant product can be diluted with a suitable solvent to form a more liquid product that is easier to handle and use. The temperature at which the solvent is added is not critical, but the solvent should be added at a temperature where the coagulant composition is still pliable and the solvent will not rapidly evaporate.

Two reactions appear to occur between the oil component and the polymer component based upon the temperature and time. The first endpoint of the reaction results in a rubbery viscoelastic, relatively soft product with a melting point in the range of 100° F. to 250° F. This first endpoint product is homogeneous and does not separate upon melting or dissolution. This reaction occurs at 350° F.–500° F. This is designated the "first endpoint product" (solubility product).

In the second reaction, the polymer undergoes complete or partial chain fission into discrete polymer free radicals at a temperature above about 500° F. At between 350° F. to 500° F., it is believed that partial chain fission of the polymer component (isobutylmethacrylate polymer has a m.w.=300,000 Daltons) occurs at the end of the chain or in the middle. This results in a lower molecular weight product. It is believed that there may also be a solubility reaction occurring (similar to Sn and Pb forming solder) within the ternary composition. The occurrence of a chemical reaction is confirmed, however, due to the change of molecular weight.

Reactions at above 500° F. and up to 900° F. maintained at temperature from 5 minutes to 20 hours, depending on activation energy of compositions, result in the second endpoint product. This reaction is visually observable by color, rheology, and specific heat change in the product [Note: For the first endpoint product the end of the reaction is observed by change in color and a rheology change and the cessation of solution outgassing. There is also a change in specific heat as measured by Differential Scanning Calorimetry]. The second endpoint product has a weight average molecular weight in the range of about 62,000 Daltons which is consistent with complete chain fission of the polymer, resulting in smaller free radicals which results in a lower molecular weight compound. The melting point of these products is usually above 300° F. if the oil component is highly unsaturated, which results in a solid product due to the formation of highly bonded three dimensional densely packed molecular matrix. If the oil component has a low degree of unsaturation, the resultant product is usually liquid, which is consistent with this type of reaction.

The oily component and the polymer component are reacted in a thermal reaction that does not appear to be sensitive to the atmosphere under which the reaction is carried out, i.e., whether it is an inert, oxidizing or reducing atmosphere. Coagulant compositions have been prepared by this reaction which range from soft to hard, and elastomeric to brittle in nature depending upon the ratio of the oil component to the polymer component and the choice of the polymer component and/or the oil component used.

If the reaction mixture separates into two phases upon cooling it is not useful as a coagulant. In this manner, any polymer can be identified for use in the invention.

The diluted coagulant composition made according to the above-described process generally has the following properties:

boiling point: variable, depending upon ingredient types and amounts
appearance: pale yellow clear oily liquid
odor: very mild, characteristically oily
water solubility: negligible
non-volatile material: 0–50%
flash point: variable, depending upon ingredient types and amounts (>140° F., with solvent; higher without solvent)
flammability: combustible liquid
viscosity: 230–4740 cps To use the coagulant composition of the instant invention, it can be applied directly to an oil-laden surface, or can be first diluted with any appropriate solvent, and then sprayed or otherwise dispersed upon an oil spill. The composition coagulates the spilled oil such that the coagulated oil floats on the surface of the water. Alternatively, the diluted composition can be introduced onto a porous substrate, whereupon the solvent will evaporate, leaving the oil/polymer composition impregnated in the substrate. This impregnated substrate can then be spread upon an oil spill where it causes coagulation of the oil and allows for easy collection of the coagulated oil, which typically floats on the surface of the water.

The polymer/oil coagulant composition can be used to coagulate spilled oil and to cause the coagulated oil to float through a process of generally applying the composition to the surface of the oil spill. The composition can be handled more easily when it is diluted with an appropriate solvent, but in certain cases it can be preferable to apply the polymer/oil coagulant composition directly. The diluted coagulant product can be sprayed on top of the oil spill from a plane or boat, or the coagulant can be introduced at only one site, or an edge of the spill. When the coagulant is sprayed on top of the oil spill, no agitation is required in order for the coagulant to coagulate the spilled oil. When the coagulant is introduced at a site of the oil spill, however, agitation may be required depending upon the wave action of the water in combination with the properties of the coagulant, i.e., the wave action can be sufficient to spread the coagulant throughout the oil spill. Preferably, the amount of coagulant used in terms of the amount of spilled oil should be from about 1 to about 15% of the weight of spilled oil. Our studies have shown that if, as compared to the amount of oil spilled, an amount of coagulant equal to 5% of the spilled oil is used, the coagulant will remove 99% of the spilled oil. If an amount of coagulant is used that is equal to 10 to 15% of the spilled oil, the coagulant will remove 99.9% of the spilled oil. When 99.9% of the spilled oil has been coagulated and removed, only a trace amount of oil remains in the water.

A unique feature of the present coagulant and the methods of using the coagulant is that no agitation is required to mix the coagulant with the spilled oil when the coagulant is sprayed on top of the oil spill. In addition, as stated, if the coagulant is introduced at the side of the spill, depending upon the wave action of the water in combination with the nature of the coagulant used, agitation may not be required because the wave action may be sufficient to disperse the coagulant throughout the spill. And, when agitation has been used to simulate very rough waters, the coagulant acts very quickly (less than one (1) minute) to coagulate both the light and heavy components of the spilled oil despite extreme agitation.

Another unique feature of the invention is that both the polymer/oil coagulant compositions of the present invention and the resulting coagulated oil mass float on top of the water and remain on the surface of the water despite tremendous agitation or wave motion. This flotation aspect of the present invention makes it easier to remove the coagulated oil from the water.

In addition, our studies have also shown that the coagulant and methods of using the same will coagulate oil that has been spilled on water regardless of water or air temperature, and the coagulant works in both salt water and fresh water. After the coagulant has coagulated the spilled oil, the floating admixture should simply be removed from the water by any mechanical means such as, for example, scooping type devices, that are well-known in the art.

Another method of using the coagulant product is to impregnate it in or on a porous substrate that is then distributed across an oil spill. The porous substrate can be any substrate having a high surface area and the capacity to carry or absorb the product. However, the porous substrate should not negatively affect the coagulation process or chemistry of the coagulant product. Examples of suitable substrates are vermiculite, wood shavings or chips, wood pulp, paper, STYROFOAM®brand polystyrene, silicas, kaolin, chicken feathers, zeolite, aluminas, calcium carbonate, and natural and synthetic fibers, especially those derived from cellulose, polyethylene or polypropylene.

The compositions can be applied to the porous substrate in either a neat or diluted solution, depending upon the particular coagulant composition being utilized. The composition (or diluted composition) is sprayed onto or mixed with the substrate at ratios from about 10% to 200% w/w composition/substrate. The impregnated substrate is then dried. It is anticipated that the impregnations could be accomplished on a larger scale using equipment such as a Henshel mixer or V-blender.

In particularly preferred embodiment of the present invention, the coagulant compositions are applied to particular substrates designed for optimal cleanup of certain oil cleaning situations. In particular, mats and pads of non-woven polypropylene can be utilized as substrates for the coagulant compositions. These mats and pads, in a variety of sizes and configurations, can then be utilized for specific cleanup operations where it is necessary to wipe various surfaces to cleanup the oil. Such mats and pads are particularly advantageous in removal of oil from affected wildlife, machinery and solid surfaces which have come into contact with the water where the oil spill has occurred.

A preferred mat or pad configuration 10 is shown in FIGS. 2(a)–2(g). Mat or pad material is folded along axis a—a, then along axis b—b and c—c, as seen in FIGS. 2(a)–(d). One or more edges or corners may be sealed or sewn together as indicated, for example, by the x's in FIG. 2(d). The mat or pad 10 may be cut into a plurality of fingers 20 which may include loops or flat strips formed from cutting into the folded mat or pad configuration 10, thereby forming a containment boom 30.

A further preferred embodiment involves the use of substrates which are designed in the form of booms to contain and surround the oil spill in open waters. Typically, when oil spillage occurs in such open waters, it is critical to the environment to prevent the further dispersement of the oil to the shoreline. In such cases, a floatable boom impregnated with the oil coagulant composition can most advantageously be utilized to prevent the further soiling of the environment.

In a highly preferred embodiment, the boom is shaped so as to provide means for removing an oil spill from a buoyant liquid, by providing a strip of material, or rope, having a plurality of fingers comprised of a buoyant material depending from said strip, wherein said fingers are adapted to float on the buoyant liquid and contact the oil. Optionally, attachment means at the end of each strip, adapted so as to enable the coupling of more than one strip to another, can be included in the boom. Typically, the boom material consists of a polyethylene, polypropylene or other floatable substance sheet material, folded and cut so as to provide the plurality of fingers. In an especially preferred embodiment the fingers are fashioned so as to provide a loops attached to strip of material, or a rope material. This boom material is then impregnated with the oil coagulant material of the present invention. Typically, the boom is manufactured in sections of convenient lengths, such as 10–12 foot lengths, and provided with attachment means so that a multitude of the booms can be connected to each other to form a containment boom of the necessary length.

Figure 3A:
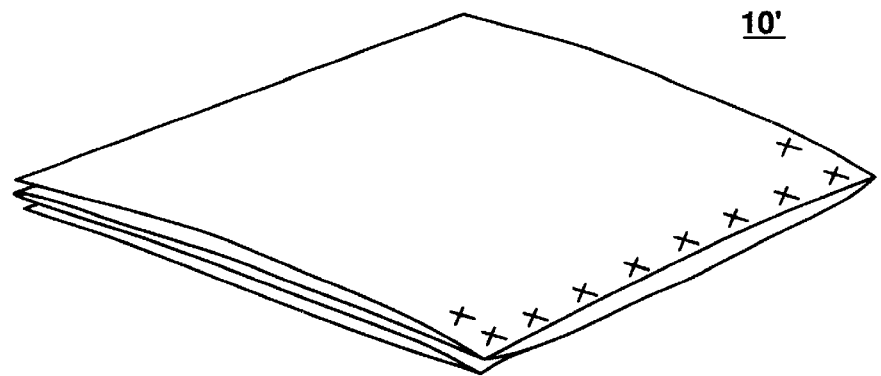
FIGS. 3(a)–3(c) show views of a typical configuration of a containment boom, optionally impregnated with the coagulant composition of the instant invention, for use in the cleanup procedures of oil or asphalt spills.
Figure 3B:
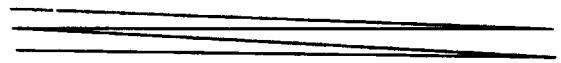
Figure 3C:
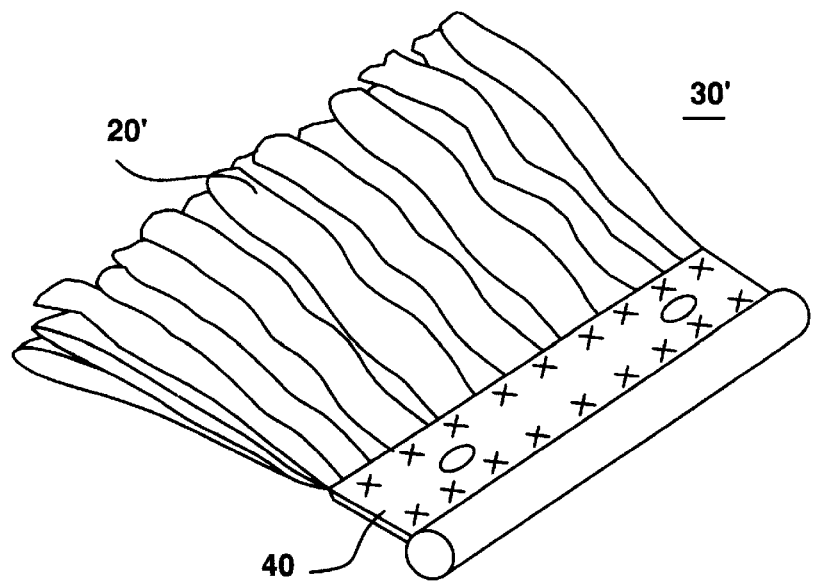
Figure 4A:
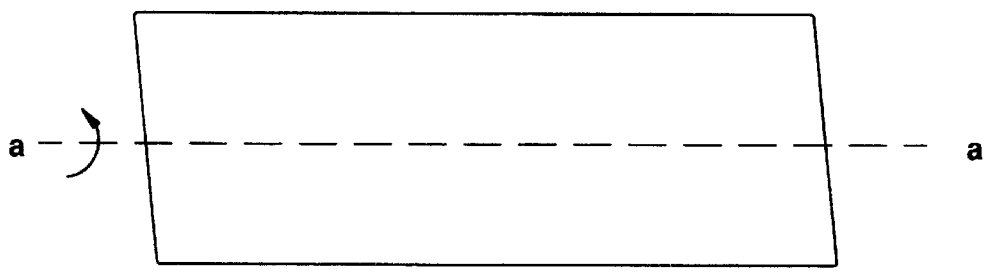
FIG. 4(a) shows a mat or pad suitable for folding along axis a—a.
Figure 4B:
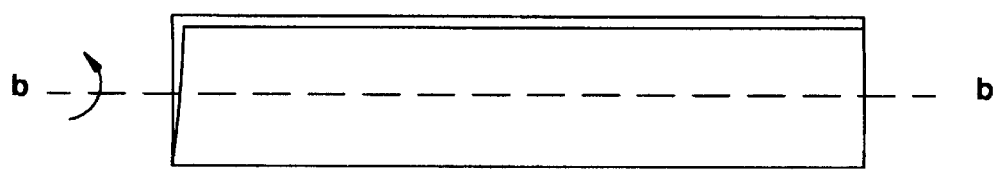
FIG. 4(b) shows the folded mat or pad of FIG. 4(a) suitable for folding along axis b—b.
Figure 4C:
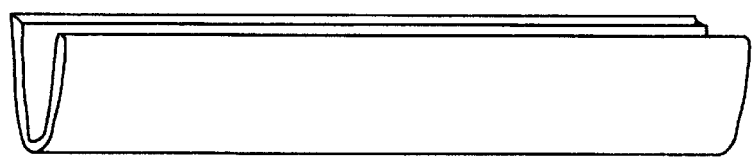
FIG. 4(c) shows the folded mat or pad of FIG. 4(b).
Figure 4D:
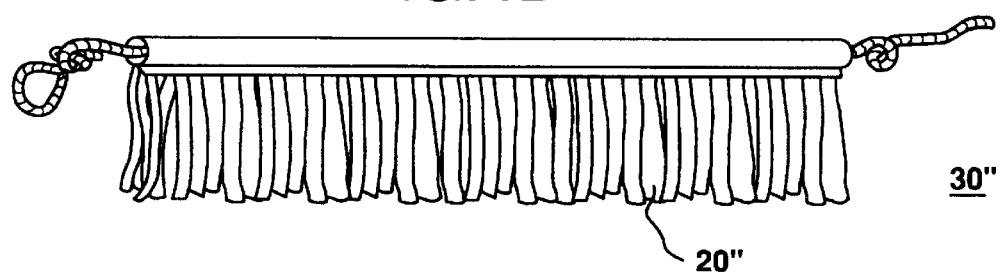
FIG. 4(d) shows a containment boom formed from the folded mat or pad of FIG. 4(c).

A preferred containment boom configuration is shown in FIGS. 3(a)–3(c). A mat or pad material or sheet is folded with accordian-like folds, as best seen in FIG. 3(b), and is preferably sealed along one or more edges or corners as indicated, for example, by the x's in FIG. 3(a), to form a mat or pad 10 which may be cut into a plurality of fingers or loops 20' as seen in FIG. 3(c), thereby forming a containment boom configuration 30'. Another preferred embodiment is show in FIGS. 4(a)–4(d). Mat or pad material is folded and cut, forming a containment boom 30" having a plurality of fingers or loops 20".

Still another highly preferred embodiment of the present invention involves the composition of the present invention applied to a floatable substrate such as wood chips, STYROFOAM® brand polystyrene, polypropylene or polyethylene material. Uniquely, such products, when applied to oil or asphalt spills on water, result in the floatation of the spilled oil or asphalt, even under conditions where the oil or asphalt would normally sink from the water surface, and become a further, more permanent biohazard, removable only by diving salvage crews. For instance, when the thermal reaction, product of methacrylate polymer with linseed oil is applied to a boom such as described hereinabove at a rate of about 1–15%, liquid asphalt and Group 5 heavy oils are retained at the water surface where they can be easily removed by mechanical means, and without expensive diving salvage operations which would otherwise be necessary for the cleanup of such spills.

The following examples demonstrate various combinations of oil components, polymer components, and solvents that give the desired properties of the invention. The examples demonstrate exemplary embodiments of the present invention and are not intended to be construed as limiting the scope of the invention.

EXAMPLES

Example 1

A. 1000 g of linseed oil is charged to a closed batching reaction flask, equipped with stirring apparatus. The stirring is initiated, and the flask is heated to 235° F. at a rate of 4° F. per minute. When the temperature reaches 235° F., 340 g of du Pont Elvacite® 2045 isobutyl methacrylate polymer is slowly charged. The flask is then continuously heated to a temperature range of 425°–450° F. at a rate of 2° F. per minute with continuous stirring. While heating, clear pill tests are conducted to determine the reaction endpoint. When a clear pill test indicates that the reaction is complete, it is then cooled down by removal of the heating mantel. This composition can then be used as an oil coagulant composition.

Analysis of this material indicates
mn=number average molecular weight=111,445
mw=weight average molecular weight=228,068
mz=Z average molecular weight=417,463

B. To obtain the "second endpoint product", this reaction can be continued by heating the material to a temperature of about 546° F. and maintaining this temperature for a period of about 30 minutes. The solution undergoes a second color change to dark amber. Upon cooling, the solution remained liquid.

Analysis of this material gives two peaks in the molecular weight chromatogram shown in FIG. 5. Reintegration of these peaks gives the following results:
mn=number average molecular weight=1267
mw=weight average molecular weight=62078
mz=Z average molecular weight=424877

C. In an optional step, when the reaction detailed in Paragraph B reaches approximately 180° F., 1340 g of 2,2,4-trimethyl-1,3-pentanediol monoisobutyrate is added. Cooling is continued down to 150° F. The batch is then filtered using a 200 micron filter bag, cooled to room temperature and stored. This composition can also then be used as an oil coagulant composition, particularly for application to a solid substrate.

Repetition of the procedures detailed in Example 1, but substituting the types and amount of ingredients enumerated in Examples 2–20 below, and noting any change in reaction conditions such as the type of atmosphere used during the conduct of the reaction, various oil coagulant compositions are prepared. In each of the various compositions, the listed solvent can be an optional diluent.

Example 2 oil component: 1000 g soybean oil
polymer component: 340 g methyl methacrylate polymer
atmosphere: $N_2$
solvent: 1340 g anhydrous isopropanol

Example 3 oil component: 1000 g soybean oil
polymer component: 1000 g isobutyl methacrylate polymer
atmosphere: $N_2$
solvent: 2000 g 2,2,4-trimethyl-1,3-pentanediol monoisobutyrate

Example 4 oil component: 1000 g linseed oil
polymer component: 680 g ethyl methacrylate/methacrylate copolymer
atmosphere: $CO_2$
solvent: 1680 g 2,2,4-trimethyl-1,3-pentanediol mono isobuty rate

Example 5 oil component: 1000 g linseed oil
polymer component: 680 g isobutyl methacrylate polymer atmosphere: air
solvent: 1680 g 2,2,4-trimethyl-1,3-pentanediol monoisobuty rate

Example 6 oil component: 1000 g linseed oil
polymer component: 500 g isobutyl methacrylate
atmosphere: $CO_2$
solvent: 1500 g 2,2,4-trimethyl-1,3-pentanediol monoisobutyrate

Example 7 oil component: 1000 g sunflower oil
polymer component: 1000 g isobutyl methacrylate polymer
atmosphere: $N_2$
solvent: 2000 g propylene glycol monomethyl ether

Example 8 oil component: 1000 g sunflower oil
polymer component: 340 g isobutyl methacrylate polymer
atmosphere: air
solvent: 1340 g 2,2,4-trimethyl-1,3-pentanediol monoisobutyrate

Example 9 oil component: 1000 g tung oil
polymer component: 340 g isobutyl methacrylate polymer
atmosphere: $N_2$
solvent: 1340 g 2,2,4-trimethyl-1,3-pentanediol monoisobuty rate

Example 10 oil component: 1000 g soybean oil
polymer component: 340 g isobutyl methacrylate polymer
atmosphere: air
solvent: 1340 g propylene glycol monomethyl ether

Example 11 oil component: 1000 g tung oil
polymer: 440 g ethyl methacrylate/methacrylate copolymer
atmosphere: $CO_2$
solvent: 1440 g 2,2,4-trimethyl-1,3-pentanediol monoisobutyrate

Example 12 oil component: 1000 g sunflower oil
polymer component: 680 g isobutyl methacrylate polymer
atmosphere: $CO_2$
solvent: 1680 g 2,2,4-trimethyl-1,3-pentanediol monoisobutyrate

Example 13 oil component: 1000 g linseed oil
polymer component: 340 g n-butyl methacrylate
atmosphere: air
solvent: 1340 g isopropanol

Example 14 oil component: 1000 g fish oil
polymer component: 340 g isobutyl methacrylate
atmosphere: air
solvent: 1340 g isopropanol

Example 15 oil component: 1000 g tung oil
polymer component: 340 g n-butyl methacrylate
atmosphere: air
solvent: 1340 g isopropanol

Example 16 oil components: 500 g tung oil and 500 g fish oil
polymer component: 340 g isobutyl methacrylate
atmosphere: air
solvent: 1340 g isopropanol

Example 17 oil components: 500 g tung oil and 500 g linseed oil
polymer components: 340 g n-butyl methacrylate 170 g isobutyl methacrylate
atmosphere: air
solvent: 1340 g isopropanol

Example 18 oil component: 500 g fish oil and 500 g sunflower oil
polymer component: 170 g n-butyl methacrylate 170 g isobutyl methacrylate
atmosphere: air
solvent: 1340 g isopropanol

Example 19 oil component: 500 g soybean oil and 500 g tung oil
polymer components: 170 g n-butyl methacrylate 170 g isobutyl methacrylate
atmosphere: air
solvent: 1340 g isopropanol

Example 20 oil components: 500 g fish oil and 500 g soybean oil
polymer: 170 g n-butyl methacrylate 170 g isobutyl methacrylate
atmosphere: air
solvent: 1340 g isopropanol

Example 21

Each of the above Examples 2–12, after the addition of solvent, was mixed with 1) vermiculite; 2) packing paper; 3) wood chips; and 4) STYROFOAM® brand polystyrene. The compositions were added to the substrates at weight to weight ratios of 20% (vermiculite) 200% (paper), 20% (wood chips) and the saturation point STYROFOAM® brand polystyrene. The solutions were mixed with the substrate and the so-impregnated substrate was dried.

Example 22

The protocol of Example 21 was carried out on the compositions of Examples 2, 6, 10, 11 and 12, excluding the addition of the solvent thereto. The polymer/glyceride coagulant compositions were added to the substrate when the composition was still warm and liquid at weight to weight ratios of 10% (vermiculite) 100% (paper), 10% (wood chips) and the saturation point

Example 23

Coconut oil (a non-drying oil) was used in 3:1 and 1:1 ratios with isobutyl methacrylate polymer and in a 4.2:1 ratio with ethyl methacrylate/methacrylate copolymer. The coconut oil/ethyl methacrylate/methacrylate copolymer combination separated out upon cooling and was thus not useful. The coconut oil combinations which formed a homogenous product did function as a coagulant compositions.

Repetition of the procedures detailed in Example 1, but substituting the types and amount of ingredients enumerated in Examples 24–30 below, and noting any change in reaction conditions such as the type of atmosphere used during the conduct of the reaction, various oil coagulant compositions are prepared. In each of the various compositions, no solvent is utilized.

Example 24 oil component: 340 g linseed oil
polymer: 1000 g ethyl methacrylate/methacrylate copolymer
atmosphere: $N_2$ Example 25 oil component: 1000 g linseed oil
polymer: 500 g ethyl methacrylate/methacrylate copolymer
atmosphere: air Example 26 oil component: 1000 g linseed oil
polymer: 500 g methyl methacrylate/methacrylate copolymer
atmosphere: $CO_2$ Example 27 oil component: 1000 g sunflower oil
polymer: 340 g ethyl methacrylate/methacrylate copolymer
atmosphere: $CO_2$ Example 28 oil component: 1000 g sunflower oil
polymer: 340 g ethyl methacrylate/methacrylate copolymer
atmosphere: $N_2$ Example 29 oil component: 1000 g sunflower oil
polymer: 1000 g ethyl methacrylate/methacrylate copolymer
atmosphere: air Example 30 oil component: 1000 g soybean oil
polymer: 1000 g ethyl methacrylate/methacrylate copolymer
atmosphere: air Example 31
Test Results of Oil Coagulant Compositions The combinations of Examples 1 and 2 yielded homogenous glyceride/polymer compositions that did not separate into two component mixtures upon cooling. The glyceride/polymer compositions dissolved readily into the solvent to yield oily liquids ranging in viscosity from about 230 to 4740 cps.

Samples of the glyceride/polymer/solvent coagulant products prepared according to Examples 1–2 were supplied to Leberco Testing Incorporated to determine the ability of the composition to coagulate spilled oil. The coagulant product was evaluated for its coagulating properties in cold fresh water and cold simulated salt water in which an oil spill was simulated. The coagulant was evaluated for its ability to remove non-detergent motor oil; number 6 fuel oil; heavy crude bottoms; sour crude; sweet crude; and number 2 fuel oil.

The testing procedure used tap water at 20° C. and at 10° C. and simulated salt water prepared in accordance with ASTM D1141 (Substitute Ocean Water) also at 20° C. and 10° C. The oil concentration on the water was at 1–10% of the water volume. The coagulants were evaluated at from 1–15% by volume of the oil concentration with agitation times ranging from 1–3 minutes and coagulation times at 0.5 and 2 minutes. Following the addition of the coagulant and the agitation, and after the coagulation time allowed, the oil-coagulant admixture product floated on the top of the water and was removed by mechanical means of scooping it out.

It was observed that: (a) temperature and water type were not factors; (b) agitation time and coagulation were also not major factors; and (c) the coagulant product concentration of 1–15% to oil was adequate, however, the larger percentage would remove 99.9% of the oil and the lower percentage would remove about 99% of the oil. The findings indicate that coagulant concentrations of 5% to oil concentration generates oil removal of better than 99%. Concentration of 10–15% of coagulant to oil generates oil removal better than 99.9% with only a faint trace of oil remaining on the water surface.

The products of Examples 3–12 also were homogenous compositions which did not separate into two-part mixtures upon cooling. These products, as well as those of Examples 1 and 2, had a consistency ranging from thick liquid to semi-solid to solid upon cooling. The semi-solid and solid products ranged from hard thermoplastic resin-like to soft elastic adhesive-like. These products were tested by the following method. 20 g of "spilled" oil was added to a vessel containing 10 g of water. Coagulant was added in concentrations ranging from 1–10% w/w of oil. Coagulated oil was removed by mechanical means and by using a separatory funnel. The remaining water was weighed and percent gain calculated. The oils tested were #6 fuel oil; crude oil; crude bottoms; Lago Treco crude; Pilon crude; and 10W40 motor oil. The results are summarized in Table 1.

TABLE 1

| | % Oil Remaining | | | | |
|---|---|---|---|---|---|
| Ex. # | Pilon Crude | Lago Treco | #6 | Bunker Crude | 10W40 Motor Oil |
| 3 | <1% | <1% | <1% | <1% | <1% |
| 4 | <1% | <1% | <1% | <1% | <1% |
| 5 | <1% | <1% | <1% | <1% | <1% |
| 6 | <1% | <1% | <1% | <1% | <1% |
| 7 | not tested | | | | |
| 8 | <1% | <1% | <1% | <1% | <1% |
| 9 | <0.5% | <0.5% | <0.5% | <0.5% | <0.5% |
| 10 | not tested | | | | |
| 11 | <1% | <1% | <1% | <1% | <1% |
| 12 | <1% | <1% | <1% | <1% | <1% |

The results indicate that the coagulants were effective with all oils tested. The addition of the coagulant to the "spilled" oil quickly caused coagulated masses, which floated on the surface of the water and were easily removed as gummy masses that were attached to the impeller mixing blade, or were easily scoopable so that the coagulated oil was removed with a flat blade or spoon.

The products of Examples 13–20 were homogenous compositions which did not separate into two part mixtures upon cooling. The products were tested as coagulants following the same procedure used for Examples 3–12. These products functioned very effectively as coagulants.

Test Results of Substrates Impregnated with Oil Coagulant Compositions

The impregnated substrates' ability to coagulate oil was tested in the procedure described above for Examples 3–12. The results are summarized in Table 2.

TABLE 2

| Glyceride/Polymer/Solvent Composition | Substrate | % Oil Remaining | | | | |
|---|---|---|---|---|---|---|
| | | Pilon Crude | Lego Treco | #6 | Bunker Crude | 10W40 Motor Oil |
| 2 | vermiculite | >0.5% | <0.5% | <0.5% | <0.5% | <0.5% |
| | paper | <0.5% | <0.5% | <0.5% | <0.5% | <0.5% |
| | wood chips | <0.5% | <0.5% | <0.5% | <0.5% | <0.5% |
| | STYROFOAM ® brand polystyrene | <0.5% | <0.5% | <0.5% | <0.5% | <0.5% |
| 3 | vermiculite | <1% | <1% | <1% | <1% | <1% |
| | paper | <1% | <1% | <1% | <1% | <1% |
| | wood chips | <1% | <1% | <1% | <1% | <1% |
| | STYROFOAM ® brand polystyrene | <1% | <1% | <1% | <1% | <1% |
| 4 | vermiculite | <0.5% | <0.5% | <0.5% | <0.5% | <0.5% |
| | paper | <0.5% | <0.5% | <0.5% | <0.5% | <0.5% |
| | wood chips | <0.5% | <0.5% | <0.5% | <0.5% | <0.5% |
| | STYROFOAM ® brand polystyrene | <0.5% | <0.5% | <0.5% | <0.5% | <0.5% |
| 5 | vermiculite | <0.5% | <0.5% | <0.5% | <0.5% | <0.5% |
| | paper | <0.5% | <0.5% | <0.5% | <0.5% | <0.5% |
| | wood chips | <0.5% | <0.5% | <0.5% | <0.5% | <0.5% |
| | STYROFOAM ® brand polystyrene | <0.5% | <0.5% | <0.5% | <0.5% | <0.5% |
| 6 | vermiculite | <1% | <1% | <1% | <1% | <1% |
| | paper | <1% | <1% | <1% | <1% | <1% |
| | wood chips | <1% | <1% | <1% | <1% | <1% |
| | STYROFOAM ® brand polystyrene | <1% | <1% | <1% | <1% | <1% |
| 7 | vermiculite | <1% | <1% | <1% | <1% | <1% |
| | paper | <1% | <1% | <1% | <1% | <1% |
| | wood chips | <1% | <1% | <1% | <1% | <1% |
| | STYROFOAM ® brand polystyrene | <1% | <1% | <1% | <1% | <1% |
| 8 | vermiculite | <1% | <1% | <1% | <1% | <1% |
| | paper | <1% | <1% | <1% | <1% | <1% |
| | wood chips | <1% | <1% | <1% | <1% | <1% |
| | STYROFOAM ® brand polystyrene | <1% | <1% | <1% | <1% | <1% |
| 9 | vermiculite | <0.5% | <0.5% | <0.5% | <0.5% | <0.5% |
| | paper | <0.5% | <0.5% | <0.5% | <0.5% | <0.5% |
| | wood chips | <0.5% | <0.5% | <0.5% | <0.5% | <0.5% |
| | STYROFOAM ® brand polystyrene | <0.5% | <0.5% | <0.5% | <0.5% | <0.5% |
| 10 | vermiculite | <1% | <1% | <1% | <1% | <1% |
| | paper | <1% | <1% | <1% | <1% | <1% |
| | wood chips | <1% | <1% | <1% | <1% | <1% |
| 11 | STYROFOAM ® brand polystyrene | <1% | <1% | <1% | <1% | <1% |
| | vermiculite | <1% | <1% | <1% | <1% | <1% |
| | paper | <1% | <1% | <1% | <1% | <1% |
| | wood chips | <1% | <1% | <1% | <1% | <1% |
| | STYROFOAM ® brand polystyrene | <1% | <1% | <1% | <1% | <1% |
| 12 | vermiculite | <1% | <1% | <1% | <1% | <1% |
| | paper | <1% | <1% | <1% | <1% | <1% |
| | wood chips | <1% | <1% | <1% | <1% | <1% |
| | STYROFOAM ® brand polystyrene | <1% | <1% | <1% | <1% | <1% |

In all cases, the coagulated mass floated on top of the water and the amount of residual oil after scooping was less than 1%. The substrate impregnated product needed no agitation.

Examples 24–30 initially were not tested as coagulants because they did not form homogeneous products, but rather separated into two parts upon cooling off. Apparently, the thermal reaction does not occur between these specific glyceride and polymer combinations at the temperatures used for the other examples. However, when the combinations of these examples were reacted at temperatures ranging from about 500 to 700° F. homogenous products did result which functioned as coagulants.

The above Examples 2–12 glyceride/polymer compositions were also diluted 50:50 with the following solvents: propylene glycol monomethyl ether, available under the trade name DOWANOL PM; 2,2,4-trimethyl-1,3-pentanediol monoisobutyrate, available under the trade names TEXONOL and FLIMER IBT; isopropyl alcohol; and mineral spirits or aliphatic hydrocarbons, available under the trade name SHELSOL 340. The coagulants prepared with these solvents also removed >99% of "spilled" oil. Acetone is a preferred solvent to use for compositions that are used to impregnate surfaces.

Example 32

Chemical Analysis of the Oil Coagulant Compositions:

The mechanism of the thermal reaction remains to be elucidated. While not wishing to be bound by any theory in this regard the reaction appears to be a polymerization or phase transition reaction brought about by heat and which is stable at lower temperatures. It is hypothesized that the elevated temperatures create monomer free radicals of the polymers and copolymers which then crosslink with the unsaturated glyceride molecules. It is also hypothesized that perhaps a phase transition is occurring between the oil component and the polymer component. In an effort to determine what type of interaction or reaction is occurring between the oil component and the polymer component, thermal analysis of several of the Example products was conducted. The results indicate that a reaction is occurring between the oil component and the polymer.

Differential scanning calorimetry (DSC) was performed on the reactions of Examples 9 and 10. DSC is a thermal analysis technique that measure the quantity of energy absorbed or evolved by a sample in calories as its temperature is changed. The sample and a reference material are heated at a programmed rate. At a transition point in the sample's heating, such as when it reaches a melting point, the sample requires more or less energy than the reference to heat. These points are indicated the typical DSC readout.

Samples were taken at the beginning of the reaction procedure described earlier and at the end of the reaction. As shown in FIG. 1A, the DSC profile for the initial starting materials of Example 9 is dramatically different from the profile of the product (FIG. 1B). The initial profile shows two exothermic events when the DSC analysis is carried out from 40°–280° C., one event occurring at about 100° C. and the other at about 217° C. In the DSC profile of the reaction product, however, there is only one exothermic event, occurring at about 261° C. The samples were taken at initial and final points during the reaction and allowed to cool to room temperature before being subjected to the DSC.

Figure 1C:
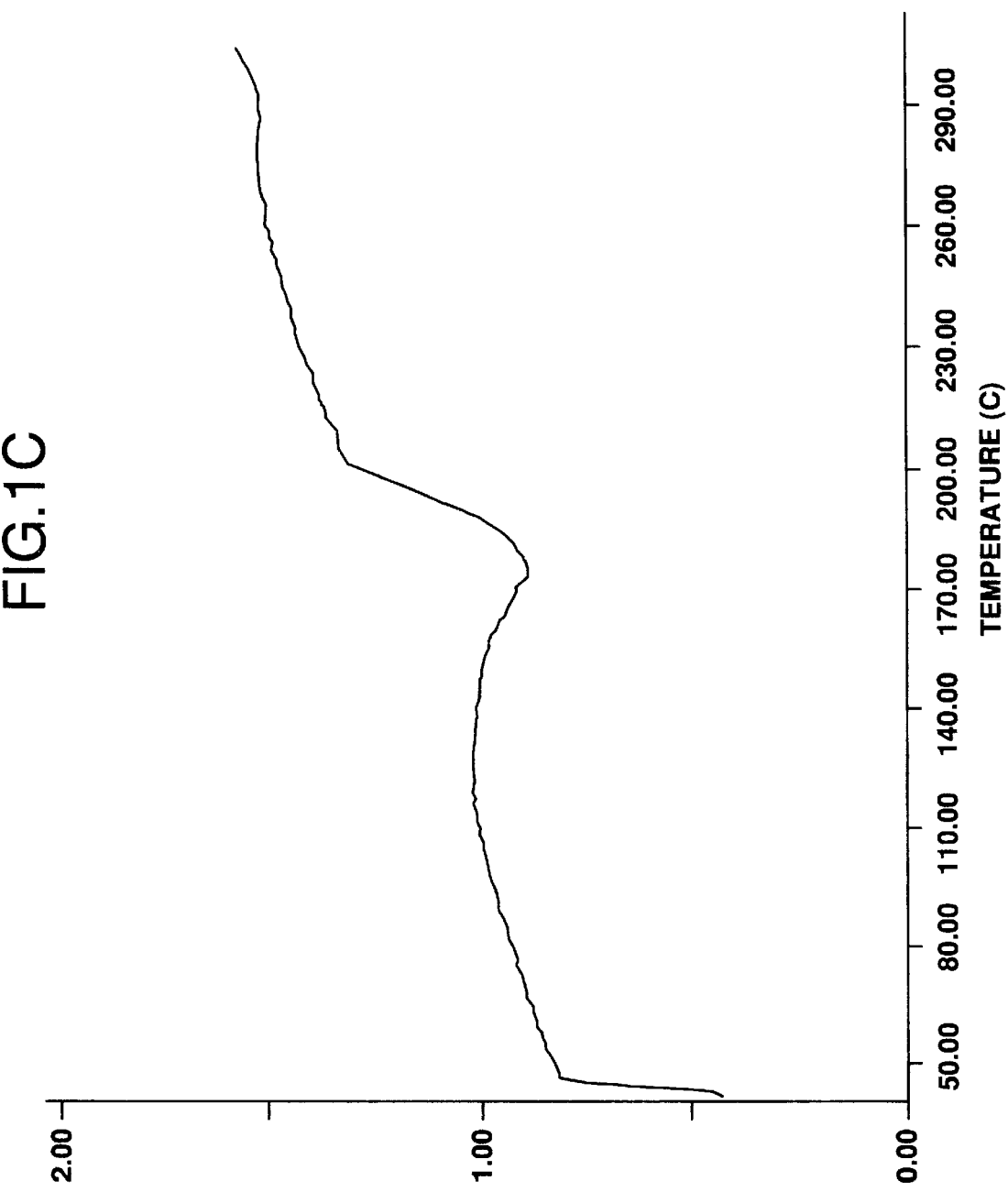
FIG. 1C is a DSC profile of the starting materials of Example 10.
Figure 1D:
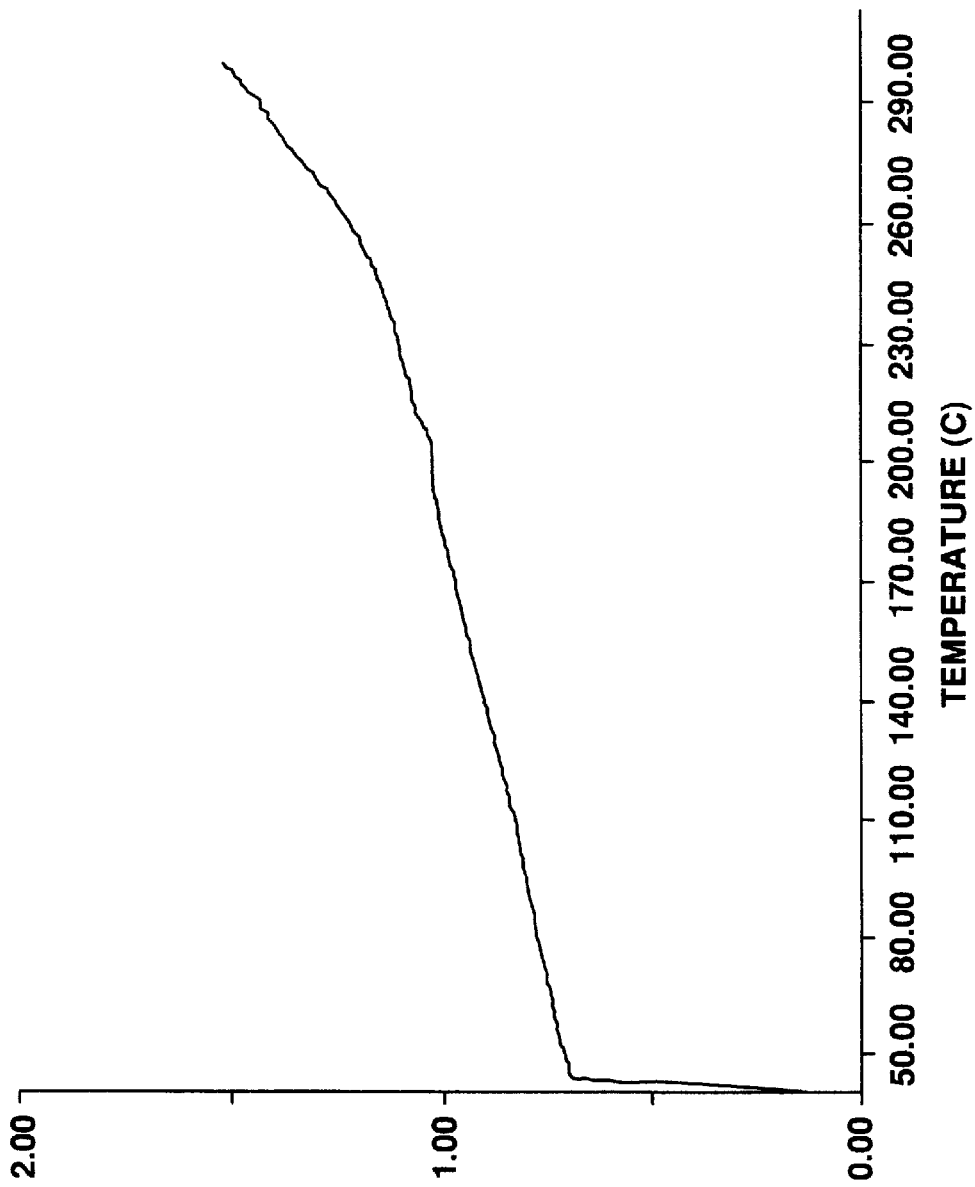
FIG. 1D is a DSC profile of the product of Example 10.
Figure 2A:
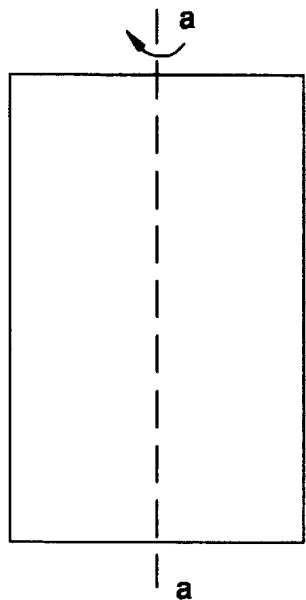
FIGS. 2(a)–2(g) show views of a typical configuration of a mat or pad, optionally impregnated with the coagulant composition of the instant invention, for use in the cleanup procedures of oil spills.
Figure 2B:
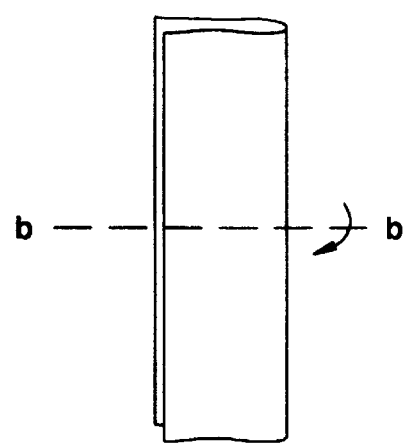
Figure 2C:
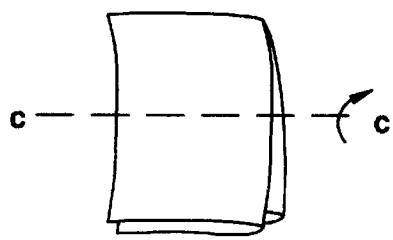
Figure 2D:
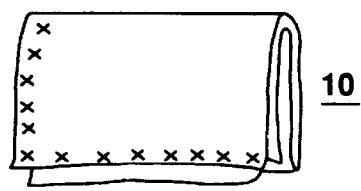
Figure 2E:
Figure 2F:
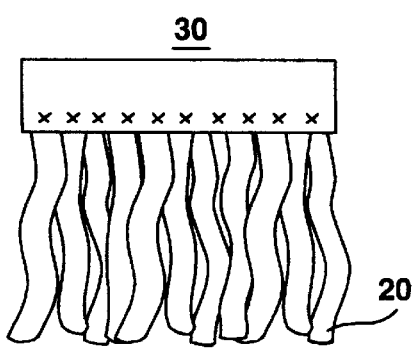
Figure 2G:
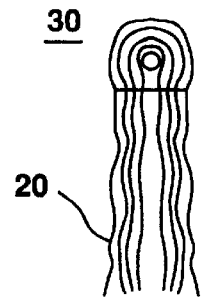

FIGS. 1C and 1D illustrate DSC's of the starting materials and final product of Example 10. Again, the DSC curves generated show that two thermal events occurred for the "just mixed" reactants while only one thermal event occurred for the final product. Thus, the DSCs indicate that the occurrence of a reaction or phase transformation.

Example 33 oil component: 5 g linolenic Acid [$CH_3(CH_2CH=CH)_3(CH_2)_7COOH$] BP=230° C., sg=0.914
polymer component: 3 g Elvacite® 2045 poly (isobutylmethacrylate)
Reaction Conditions: Tmax=550° F. $T_R$=≈350° F.
Reaction Visible at=350° F. as evidenced by color change to bright yellow and instant cessation of bubbling. Formed Bright Clear Yellow Homogeneous Product Similar to Example 1.
Very Fast Reaction Rate
Functional Test with tissue paper (T.P.) infused w/sample composition $$\text{Sigma} = 0.25 = \frac{\text{amount of composition}}{\text{amount of composition + substrate}}$$

Example 34 oil component: 5 g trans-7-tetradecene $CH_3(CH_2)_5CH=CH(CH_2)_5CH_3$
BP=250° C. Sigma=0.25
Tmax=500° F. TR=≈350° F.
polymer component: 3 g Elvacite® 2045 poly (isobutylmethacrylate)
Upon mixing, a white opaque product is formed at 500° F. after 10 minutes reaction time. When tested for coagulation of oil, it was found to form a very tight buoyant ball with #6 oil.

Example 35 oil component: 5 g cis-5-dodecanoic Acid $CH_3(CH_2)_5CH=CH(CH_2)_3COOH$
BP=135° C. sg=0.906
polymer component: 3 g Elvacite® 2045 poly (isobutylmethacrylate)
Reaction Rate: 10 min @500° F.
Bright yellow clear product Sigma=0.30

Note: This material works approximately 10× better on light oil than any other oil coagulant composition tested.

Example 36 oil component: 5 g oleic acid $CH_3(CH_2)_7CH=CH(CH_2)_7COOH$
polymer component: 3 g Elvacite® 2045 poly (isobutylmethacrylate)
Reaction Rate: 15 minutes @500° F. Sigma=0.45 Opaque white product. Moderately effective as oil coagulant.

Example 37 oil component: 5 g erucic acid $CH_3(CH_2)_7CH=CH(CH_2)_{11}CCOOH$
polymer component: 3 g Elvacite 2045 poly (isobutylmethacrylate)
Reaction Rate: Slow —600° F. for 1 hour Sigma=0.5
Dark yellow crystalline-looking product. Low to moderate effectiveness as oil coagulant.

Example 38 oil component: 5 g 10-Undecynoic Acid $HC=C(CH_2)_8COOH$
polymer component: 3 g Elvacite® 2045 poly (isobutylmethacrylate)
Instant Reaction @≈375° F. Sigma=0.40
Dark Black rubbery product
Weak to mediocre performance.

Example 39 oil component: 5 g decyne $CH_3(CH_2)_7C=CH$
polymer component: 3 g Elvacite® 2045 poly (isobutylmethacrylate)
Reaction Rate: Slow—1 hour @550° F.
Excellent with #6 oil. Forms very tight buoyant ball.

Example 40 oil component: 5 g stearic acid $CH_3(CH_2)_{16}COOH$
polymer component: 3 g Elvacite® 2045 poly (isobutylmethacrylate)
White opaque reaction product after 1 hour of reaction at 550° F.
Contrary to expectations, this material enhances performance of tissue paper somewhat although the coagulate is loose.
Material is not viscoelastic.
Reaction is believed to take place at the carboxy group.

Example 41 oil component: 5 g eicosane $CH_3(CH_2)_{18}CH_3$
polymer component: 3 g Elvacite® 2045 poly (isobutylmethacrylate)
Same reaction conditions as were used in Example 40, except no reaction takes place.
Solubility product separates in acetone.

Example 42 oil component: 5 g oleic Acid $CH_3(CH_2)_7CH=CH(CH_2)_7COOH$
polymer component: 3 g Elvacite® 2045 poly (isobutylmethacrylate)
Reaction Rate: 1 hour @500° F.
Initial reaction @350°–375° F. Sigma=0.50
Performance mediocre.

Example 43

Fatty Acid/Alkene/Alkyne Polymer Compositions

| Example # | 33 | 34 | 35 | 36 | 37 | 38 | 39 | 40 | 42 |
|---|---|---|---|---|---|---|---|---|---|
| Sigma | 0.25 | 0.25 | 0.3 | 0.45 | 0.5 | 0.4 | 0.35 | 0.5 | 0.5 |
| #6 Oil | 8 | 9 | 10 | 8 | 8 | 8 | 10 | 8 | 7 |
| Furrial | 7 | 8 | 10 | 7 | 5 | 6.5 | 8 | 8 | 7 |

The reaction product is infused into tissue paper in a beaker with 10 g samples of oil. 2 g product used for Furrial and 0.5 g used for #6. Performance rated visually from 1–10 based upon residue, buoyancy, water drag-out, coherence (10 at being best at removal). Sigma=α=grams polymer/ grams tissue paper+substrate.

Example 44

Due to higher C—C bond energies of Elvacite® 2008 and Elvacite® 2043 on the polymer backbone, reactions of these polymer components with linseed oil and other drying oils require higher activation energies than with the Elvacite® 2045 polymer. Consequently, reactions previously done where the drying oil was the largest component limited reaction temperatures to the boiling point of the oil component. This resulted in incomplete, sometimes heterogeneous reaction products. Stoichiometric reactions did not take place resulting in multicomponent product mixtures.

Reactions where the polymer component (w/w) is greater than the oil component (w/w) produce higher temperatures which reach the required activation energy temperature (≈600° F.) to produce stoichiometric single component products. Using this relationship, the compositions using Elvacite® 2008 and Elvacite® 2043 were appropriately formulated. Results are as follows.

Ti=Reaction initiation Temperature Tmax=Maximum Temperature

A). 70% Elvacite® 2043/30% linseed oil Ti=325° F. Tmax= 655° F.
Hard yellow opaque homogeneous reaction product
B). 70% Elvacite® 2008/30% linseed oil Ti=No Reaction Tmax=655° F.
Resultant binary mixture prepared for test as other parts.
C). 70% Elvacite® 2043/30% sunflower Oil Ti=350° F. Tmax=584° F.
Clear yellow plastic homogeneous reaction product.
D). 70% Elvacite® 2008/30% sunflower oil Ti=350° F. Tmax=659° F.
Homogeneous yellow reaction product.
E). 70% Elvacite® 2043/30% Oleic Acid Ti=400° F. Tmax= 436° F.
Homogeneous opaque soft reaction product.
F). 60% Elvacite® 2043/40% Tung Oil Ti=400° F. Tmax= 542° F.
Hard homogeneous opaque yellow product.
G). 60% Elvacite® 2008/40% Tung Oil Ti=625° F. Tmax= 660° F.
Heterogeneous product. Product separated upon solution in acetone. One phase appeared to be reacted and one phase appeared unreacted. Note: Although separation occurred upon solution in acetone the fact that the product worked at all indicates that at least some of the material was reaction product.

Reaction products A–G were infused into wood chips and tissue paper. Sigma =(wt. polymer/(wt. polymer+wt. substrate)) was calculated. The effectiveness of the coagulant product in coagulating oil was judged subjectively on a scale of 1–10 (10 being the best) based upon coagulation, buoyancy, coherence, residue, water drag-out, and by the amount of material required for effectiveness.

Results are as follows:

| TEST | COMPOSITION | OIL | AMT. | σ | RATING |
|---|---|---|---|---|---|
| LST1 TISSUES | 30%LSO 70%2043 | FO | 2 gm | 0.26 | 6 |
| LST1 TISSUES | 30%LSO 70%2043 | #6 | 0.5 gm | | 7 |
| LST1 WOODCHIPS | 30%LSO 70%2043 | FO | 8 gm | 0.15 | 7 |
| LST1 WOODCHIPS | 30%LSO 70%2043 | #6 | 2 gm | | 7 |
| LST2 TISSUES | 30%LSO 70%2008 | FO | 1.5 gm | 0.31 | 8 |
| LST2 TISSUES | 30%LSO 70%2008 | #6 | 0.5 gm | | 8 |
| LST2 WOODCHIPS | 30%LSO 70%2008 | FO | 1 gm | 0.20 | 7 |
| LST2 WOODCHIPS | 30%LSO 70%2008 | #6 | 1 gm | | 8 |
| LST3 TISSUES | 30%SFO 70%2043 | FO | 1.5 gm | 0.27 | 8 |
| LST3 TISSUES | 30%SFO 70%2043 | #6 | 0.5 gm | | 8 |
| LST3 WOODCHIPS | 30%SFO 70%2043 | FO | 5 gm | 0.13 | 7 |
| LST3 WOODCHIPS | 30%SFO 70%2043 | #6 | 1 gm | | 8 |
| LST4 TISSUES | 30%SFO 70%2008 | FO | 2 gm | 0.30 | 6 |
| LST4 TISSUES | 30%SFO 70%2008 | #6 | 0.5 gm | | 9 |
| LST4 WOODCHIPS | 30%SFO 70%2008 | FO | 8 gm | 0.15 | 7 |
| LST4 WOODCHIPS | 30%SFO 70%2008 | #6 | 1 gm | | 8 |
| LST5 TISSUES | 30% Oleic 70%2043 | FO | 2 gm | 0.29 | 7 |
| LST5 TISSUES | 30% Oleic 70%2043 | #6 | 0.5 gm | | 9 |
| LST6 TISSUES | 40% TUNG 60%2043 | FO | 2 gm | 0.37 | 8 |
| LST6 TISSUES | 40% TUNG 60%2043 | #6 | 0.5 gm | | 8 |
| LST6 WOODCHIPS | 40% TUNG 60%2043 | FO | 8 gm | 0.29 | 6 |
| LST6 WOODCHIPS | 40% TUNG 60%2043 | #6 | 2 gm | | 8 |
| LST7 TISSUES | 40% TUNG 60%2008 | FO | 2 gm | 0.34 | 7 |
| LST7 TISSUES | 40% TUNG 60 %2008 | #6 | 0.5 gm | | 8 |
| LST7 WOODCHIPS | 40% TUNG 60%2008 | FO | 8 gm | 0.22 | 5 |
| LST7 WOODCHIPS | 40% TUNG 60%2008 | #6 | 1 gm | | 8 |

-continued

| TEST | COMPOSITION | OIL | AMT. | σ | RATING |
|------|-------------|-----|------|---|--------|

LSO = linseed oil
SFO = sunflower oil
FO = furrial oil (light)
6 = #6 Crude oil (heavy)
2043 = Elvacite methacrylate/methacrylic acid copolymer
2008 = Elvacite methacrylate/methacrylic acid copolymer

Example 45

To ascertain the utility of the first and second endpoint products produced by the reactions of the instant invention, certain combinations of oil components and polymer components were reacted, with a sample of the first endpoint product being collected, and the reaction then proceeding to produce the second endpoint product.
oil component: 80 g Sunflower Oil
polymer component: 40 g isobutylmethacrylate polymer Tmax=546° F. Ti=500° F.
Both endpoints resulted in uniform single component products.

The solution was heated and first reaction endpoint was observed at ~475° F. The first endpoint @475° F. was indicated by a color change, rheology change (material became much more viscous) and the cessation of outgassing (clear pill test). Note: This is a very sharp definite endpoint as indicated by instant cessation of outgassing accompanied by simultaneous solution thickening and color change. A sample was taken at this point. Upon cooling the sample formed the familiar first endpoint (solubility product) material. The material is a soft, rubbery, viscoelastic product similar to that produced in paragraph A of Example 1 above. Oil coagulation test results were in line with previous tests performed on first endpoint products.

The remaining material was heated to a temperature of about 546° F. and this temperature is maintained for 30 minutes. The solution underwent a second color change to dark amber. Upon cooling, the solution remained liquid. The remaining sample of the first endpoint product was mixed with the second endpoint product and the mixture was again heated to 546° F. and this temperature was maintained for 15 minutes. The entire solution became dark amber and upon cooling remained liquid.

Example 46 oil component: 69 g sunflower oil
polymer component: 31 g isobutylmethacrylate polymer
<500° F.—first endpoint, standard rubbery product
>500° F. for 3 hours—Dark amber liquid product
The procedure of Example 45 was repeated substantially.
$Ti_1=350°$ F. $Ti_2=530°$ F. Tmax=593° F.

Example 47 oil component: 28 g Coconut Oil
polymer component: 72 g isobutylmethacrylate polymer
$Ti_1=350°$ F. $Ti_2=545°$ F. Tmax=545° F.
First endpoint<500° F.—Standard viscoelastic solid rubbery product
Second endpoint>500° F.—Dark amber liquid material

Example 48 oil component: 72 g Tung Oil
polymer component: 28 g isobutylmethacrylate
First endpoint<500° F.—Standard viscoelastic rubbery product, melting point≈375° F.

Second endpoint>500° F.—Very hard product formed instantly, melting point≈600° F.
Note: This result agrees with our model and is consistent with the high degree of unsaturation of tung oil unlike Examples 45–47.

Example 49

The second endpoint materials synthesized in Examples 45–48 were infused into tissue paper and tested on Furrial and #6 crude oils. Two grams of infused material was added to 10 grams of Furrial crude oil in 100 grams of water and 0.5 grams of infused substrate was added to 10 grams of #6 crude oil in 100 grams of water. The materials were evaluated visually on a scale of 1–10 based on coagulate coherence, water drag-out, residue, and buoyancy. The results are as follows:

| Example # | Sigma | Furrial Crude | #6 Crude |
|-----------|-------|---------------|----------|
| 45 | 0.33 | 7 | 9 |
| 46 | 0.28 | 9 | 9 |
| 47 | 0.23 | 0 | 5 |
| 48 | 0.3 | 8 | 9 |

The above observational data along with the molecular weight data demonstrate that two distinct reactions occur between the oil component and the polymer component and that the extent and occurrence of these reactions are determined by temperature and time.

Example 50

An oil pad 10, as seen in FIGS. 2(a–g) useful for the cleanup procedures involving oil spills is produced as follows: Using nonwoven polypropylene material (Available from Fiberweb, Inc.) in a 57 inch width roll, sheets of material are cut to 57"×43" size. After folding in half on the long axis a—a, the sheet is folded in half two more times in the opposite direction along axes bb and c—c, respectively, forming an eight layer rectangular pad 14.25"×21.5". The two loose corners or edges are then sealed with a heat sealing apparatus. FIGS. 2(a)–2(g) show a view of this pad 10. Optionally, the pad may be cut into a plurality of fingers 20 on one end and the other end sealed, as seen in FIGS. 2(f) and 2(g). A rope or wire may be inserted if a loop is formed at the sealed edge as depicted in FIG. 2(g).

In an optional, but preferred embodiment, the pad is coated with a 15% solution of the product of Paragraph A of Example 1 in acetone, and then oven-dried until the acetone solvent has evaporated. When pads are prepared in this manner, a 35 gram pad will absorb 400 grams of oil spilled on a solid surface, or 300 grams of oil spilled in water.

Example 51

A boom 30' useful for the oil containment cleanup procedures involving oil and asphalt spills, and to provide means for keeping spilled asphalt and Group 5 oils afloat is produced as follows:

A bubble pack polyethylene material cut in a 60 inch width×10 foot length is folded into four equal accordion pleats as represented in FIGS. 3(a–c). A 10 foot strip 40 of top material of polypropylene is sewed or heat stapled into place along the top edge of the folded material 10'. A polypropylene roping material is then threaded through a hole left under the top material and looped back so as to form hook loops.

In an optional, but preferred embodiment, the pad is coated with a 5% solution of the product of Example 1 in acetone, and then oven-dried until the acetone solvent has evaporated.

After coating, the four layers are sliced so as to provide a plurality of loops or fingers depending from the strip attached to the top material. Preferably, these loops or fingers are adapted to float on the buoyant liquid and contact the oil. Also optionally, attachment means are placed at the end of each strip so as to enable the coupling of more than one strip to another. A view of this boom is shown in FIGS. 3(a)–3(c).

When booms are prepared in this manner, a 5 foot section weighing approximately 250–300 grams will absorb 30–100 times its weight of oil spilled on a solid surface, or 10–20 times its weight of oil spilled in water.

Example 52

A product useful for the oil containment cleanup procedures involving oil spills is prepared by impregnating sawdust or STYROFOAM® brand polystyrene with a 5% solution of the product of Example 1 in acetone, and then oven-drying until the acetone solvent has evaporated. This affords an inexpensive product which can be easily dispersed over a wide area of an oil spill.

Example 53

The following test was performed using the materials prepared in Examples 50–52 and meltblown polypropylene (MBPP). Two 100 grm samples of oil or asphalt (molten) are poured into a 50 gallon tank. Two (2) grams of materials immediately applied to one of the samples while the other is left untreated as a control. Time to sink and degree of cohesiveness are observed by passing a glass stirring rod through the oil/coagulate. If the entire mass follows the rod and if the entire mass can be lifted from the water's surface using only the stirring rod, this is graded as a ten (10). A grading of five (5) indicates a cohesive mass which can be moved around the water surface using the rod but cannot be lifted out of the water using only the rod. A grading of one (1) indicates no cohesiveness. The results of testing using (a) a boom impregnated with a 5% solution of the product of paragraph 1 of Example 1 (designated as SBB); b1(b) STYROFOAM® brand polystyrene chips infused with a 5% solution of the product of paragraph 1 of Example a (designated as ST1) and (c) wood chips infused with a 5% solution of the product of paragraph 1 of Example 1 (designated as Wood chips) are as follows:
Index to Chart:
i=floats indefinitely (at least 3 months);
( )=cohesive rating; and
Sx=5=sinks, subscript=number of hours.

|  | Asphalt | #6 (Heavy) | Pilon Crude |
| --- | --- | --- | --- |
| Wood Chips | NA | i(8) | i(9) |
| STI | i(10) | i(9) | i(10) |
| SBB | i(10) | i(10) | i(10) |
| MBPP | 5(10) | $5_{12}(3)$ | $5_{12}(3)$ |
| Control | 5(10) | $5_{12}(2)$ | $5_{12}(3)$ |

The invention has been described in detail with particular reference to the preferred embodiments. It will be understood that variations and modifications can be effected within the spirit and scope of the invention and the claims appended hereto. For example, while the invention is described as a thermal reaction product it is anticipated that the inventive compositions could be obtained in a different way, such as by free-radical catalysis or the use of photo-sensitive reaction initiators.

What is claimed is:

1. A coagulant composition, comprising a homogenous thermal reaction product of an oil component selected from the group consisting of glycerides, fatty acids, alkenes, and alkynes, and a methacrylate or acrylate polymer component.

2. The composition of claim 1, wherein said polymer component is a methacrylate polymer.

3. The composition of claim 1, wherein said oil component is a glyceride derived from an oil selected from the group consisting of drying oils and semi-drying oils.

4. The composition of claim 1, wherein said glyceride is derived from an oil selected from the group consisting of linseed oil, sunflower oil, tung oil, fish oil, cottonseed oil, soybean oil, and combinations thereof.

5. The composition of claim 1, wherein said polymer is derived from monomers selected from the group consisting of isobutyl methacrylate, methyl methacrylate, ethyl methacrylate, and n-butyl methacrylate and combinations thereof.

6. The composition of claim 1, wherein said polymer is isobutyl methacrylate polymer.

7. The composition of claim 1, further comprising a solvent.

8. A coagulant composition comprising a homogenous thermal reaction product of about 25–85 parts by weight of an oil component selected from the group consisting of glycerides, fatty acids, alkenes, and alkynes and 15–75 parts by weight of a methacrylate or acrylate polymer component.

9. The composition of claim 8, wherein said polymer is a methacrylate polymer.

10. The composition of claim 8, wherein said oil component is between about 65–75 parts by weight and said polymer component is between about 25–35 parts by weight.

11. The composition of claim 8, wherein said oil component is a glyceride derived from an oil selected from the group consisting of linseed oil, sunflower oil, tang oil, fish oil, cottonseed oil, soybean oil, and combinations thereof.

12. The composition of claim 8, wherein said oil component is a fatty acid, alkene or alkyne containing 8–24 carbon atoms.

13. The composition of claim 12, wherein said oil component is a fatty acid, alkene or alkyne selected from the group consisting of lauric acid, linolenic acid, cis-5-dodecanoic acid, oleic acid, erucic acid, 10-undecynoic acid, stearic acid, caprylic acid, caproic acid, capric acid, palmitic acid, docosanoic acid, myristoleic acid, linoleic acid, 1-decene, trans-5-decene, trans-7-tetradecene, 1,13-tetradecadiene, 1-tetradecene, 1-decyne and 5,7-dodecadiyne.

14. The composition of claim 12, wherein said oil component is a cis-5-dodecanoic acid.

15. The composition of claim 8, wherein said polymer is derived from one or more monomers selected from the group consisting of isobutyl methacrylate, methyl methacrylate, ethyl methacrylate, and n-butyl methacrylate and combinations thereof.

16. The composition of claim 8, wherein said polymer is isobutyl methacrylate polymer.

17. The composition of claim 8, further comprising a solvent.

18. A method of preparing a coagulant composition, comprising the steps of:

heating an oil component selected from the group consisting of glycerides, fatty acids, alkenes, and alkynes to a temperature of between 230°–250° F.;

adding a methacrylate or acrylate polymer component to said heated oil component;

heating said oil component and said polymer component to a second temperature of between about 425°–700° F. to form a heated reaction mixture;

maintaining said second temperature until a clear pill test indicates the reaction endpoint is reached; and cooling said heated mixture to form a homogenous composition.

19. The method of claim 18, wherein the ratio of the oil component to the polymer component ratio is from about 3:1 to 1:3 by weight.

20. The method of claim 19, wherein said oil component is derived from an oil selected from the group consisting of linseed oil, sunflower oil, tung oil, fish oil, cottonseed oil, soybean oil and combinations thereof.

21. The method of claim 19, wherein said polymer component is derived from a monomer selected from the group consisting of isobutyl methacrylate, methyl methacrylate, ethyl methacrylate, and n-butyl methacrylate and combinations thereof.

22. The method of claim 19, wherein said polymer component is isobutyl methacrylate polymer.

23. The method of claim 19, and further comprising the step of adding a solvent to said cooled homogenous composition.

24. The method of claim 18, wherein said oil component is derived form an oil selected from the group consisting of drying oils and semi-drying oils.

25. The method of claim 18, wherein said oil component is a fatty acid, alkene or alkyne containing 8–24 carbon atoms.

26. The method of claim 18, wherein said oil component is a fatty acid, alkene or alkyne selected from the group consisting of lauric acid , linolenic acid, cis-5-dodecanoic acid, oleic acid, erucic acid, 10-undecynoic acid, stearic acid, caprylic acid, caproic acid, capric acid, palmitic acid, docosanoic acid, myristoleic acid, linoleic acid, 1-decene, trans-5-decene, trans-7-tetradecene, 1,13-tetradecadiene, 1-tetradecene, 1-decyne and 5,7-dodecadiyne.

27. The method of claim 18, wherein said oil component is a cis-5-dodecanoic acid.

28. The composition made by the method of claim 27.

29. A process for treating an oil spill, comprising the steps of:

applying a coagulant composition that is the homogenous thermal reaction product of an oil component selected from the group consisting of glycerides, fatty acids, alkenes, and alkynes and a methacrylate or acrylate polymer component to spilled oil, wherein the percentage of said composition to said spilled oil ranges about 5–15%; and allowing said composition and spilled oil to mix such that said composition coagulates said spilled oil.

30. The process of claim 29, wherein said oil component is a glyceride derived from an oil selected from the group consisting of drying oils and semi-drying oils.

31. The process of claim 30, wherein said polymer component is isobutyl methacrylate polymer.

32. The process of claim 30, wherein said oil component is a glycerides derived from an oil selected from the group consisting of linseed oil, sunflower oil, tung oil, fish oil, cottonseed oil, soybean oil and combinations thereof.

33. The process of claim 30, wherein said composition further comprises a solvent.

34. A product for coagulating oil, comprising:

a porous substrate impregnated with a coagulant composition, said composition comprising a homogenous thermal reaction product of an oil component selected from the group consisting of glycerides, fatty acids, alkenes and alkynes and a methacrylate or acrylate polymer component.

35. The product of claim 34 wherein the porous substrate is a floatable material.

36. The product of claim 35 wherein the porous substrate is polystyrene.

37. A method of rendering spilled Group 5 oil or asphalt floatable in a buoyant liquid which comprises application to said oil or asphalt of the product of claim 36.

38. The product of claim 35 wherein the porous substrate is polypropylene.

39. The product of claim 35 wherein the porous substrate is polypropylene.

40. A method of rendering spilled Group 5 oil or asphalt floatable in a buoyant liquid which comprises application to said oil or asphalt of the product of claim 35.

41. The product of claim 34, said porous substrate shaped so as to provide means for removing an oil spill from a buoyant liquid, which comprises:

a strip of material;

a plurality of fingers comprised of a buoyant material depending from said strip, wherein said fingers are adapted to float on the buoyant liquid and contact the oil; and optionally, attachment means at the end of each strip, adapted so as to enable the coupling of more than one strip to another.

42. The product of claim 34, wherein said coagulant composition comprises an oil component derived from an oil selected from the group consisting of drying oils and semi-drying oils.

43. The product of claim 34, wherein said coagulant composition comprises an oil component which is a glyceride derived from an oil selected from the group consisting of linseed oil, sunflower oil, tung oil, fish oil, cottonseed oil, soybean oil and combinations thereof.

44. The product of claim 34, wherein said coagulant composition comprises a polymer component selected from the group consisting of methyl methacrylate, ethyl methacrylate, isobutyl methacrylate, and n-butyl methacrylate and combinations thereof.

45. The product of claim 34, wherein said coagulant composition comprises a polymer component which is isobutyl methacrylate polymer.

46. A method of using the product of claim 34 to coagulate oil, comprising the steps of:

applying said composition to said spilled oil such that the percentage of said composition to said spilled oil ranges from between about 1–15%; and allowing said product and said oil to mix such that said product coagulates said spilled oil.

47. A method of forming a product for coagulating oil, comprising the steps of:

heating an oil component selected from the group consisting of glycerides, fatty acids, alkenes and alkynes to a temperature of between about 230°–250° F.;

adding a methacrylate or acrylate polymer component to said heated oil component at an oil to polymer ratio of between about 1:1 to 3:1 by weight;

heating said oil component and polymer component to a second temperature of between about 425°–700° F.;

maintaining said second temperature until a clear pill is formed;

cooling to form a homogenous composition at a ratio of composition to substrate between about 10–200% by weight.

48. The method of claim 47, wherein said substrate is selected from the group consisting of vermiculite, silica, wood chips, wood pulp, paper, polystyrene, kaolin, chicken feathers, zeolite, alumina, calcium carbonate, natural fibers and synthetic fibers.

49. The method of claim 48, further comprising the step of adding a solvent to said homogenous composition prior to the addition of said composition to said substrate.

50. The method of claim 49, wherein said solvent is acetone.

* * * * *

UNITED STATES PATENT AND TRADEMARK OFFICE
CERTIFICATE OF CORRECTION

PATENT NO.    : 5,837,146
DATED         : November 17, 1998
INVENTOR(S)   : H. Alper It is certified that error appears in the above-identified patent and that said Letters Patent is hereby corrected as shown below:

Column 27,
Lines 5, 6 and 7, should be corrected to read:

-- cooling to form a homogenous composition; and
adding a porous substrate to said homogenous composition at a ratio of composition to substrate between about 10-200% by weight. --

Signed and Sealed this

Eighteenth Day of March, 2003

JAMES E. ROGAN
*Director of the United States Patent and Trademark Office*